United States Patent
Taylor et al.

(10) Patent No.: US 6,832,425 B2
(45) Date of Patent: Dec. 21, 2004

(54) GASKET SINGULATION AND INSERTION APPARATUS AND METHODS

(75) Inventors: Dale W. Taylor, Hamilton, IN (US); Johnny M. Hickman, Ashley, IN (US)

(73) Assignee: Rieke Corporation, Auburn, IN (US)

( * ) Notice: Subject to any disclaimer, the term of this patent is extended or adjusted under 35 U.S.C. 154(b) by 239 days.

(21) Appl. No.: 10/292,646

(22) Filed: Nov. 12, 2002

(65) Prior Publication Data

US 2004/0088848 A1 May 13, 2004

(51) Int. Cl.[7] .............................................. B23P 19/04
(52) U.S. Cl. ........................ 29/412; 29/417; 29/429.4; 29/451; 29/771; 29/809; 29/252; 29/426.1; 277/910; 277/944
(58) Field of Search .......................... 29/412, 413, 414, 29/417, 418, 426.1, 426.4, 426.5, 711, 771, 791, 809, 235, 252, 284, 450, 451; 277/910, 924, 944

(56) References Cited

U.S. PATENT DOCUMENTS

| | | | |
|---|---|---|---|
| 2,206,262 A | 7/1940 | Olt | 206/56 |
| 2,792,625 A | 5/1957 | Hoffman | 29/453 |
| 2,840,892 A | 7/1958 | Edrmann | 29/211 |
| 3,553,815 A | 1/1971 | McElvy | 29/208 |
| 3,585,775 A | 6/1971 | Stenniken | 52/33 |
| 3,665,578 A | 5/1972 | Jaquette | 29/211 |
| 3,686,741 A | 8/1972 | Williams et al. | 29/450 |
| 3,759,377 A | 9/1973 | Weimer | 206/65 |
| 4,532,706 A | 8/1985 | Horn | 29/809 |
| 4,571,804 A | 2/1986 | Grabler et al. | 29/235 |
| 4,845,822 A | 7/1989 | Hutson | 29/235 |
| 5,062,194 A | 11/1991 | Mercurio et al. | 29/451 |
| 5,226,223 A | 7/1993 | Malarz et al. | 29/809 |
| 5,392,505 A | 2/1995 | Harada | 29/450 |

*Primary Examiner*—David P. Bryant
*Assistant Examiner*—Jermie E. Cozart
(74) *Attorney, Agent, or Firm*—Woodard, Emhardt, Moriarty, McNett & Henry LLP

(57) ABSTRACT

A gasket singulation apparatus for separating one gasket from a web-connected stack of gaskets includes a mandrel for receiving the web-connected stack and an arrangement of cylinders which are used to support the web-connected stack of gaskets and to pull one gasket away from the remainder of the web-connected stack so as to singulate that one gasket. A first plurality of cylinders are used to support the web-connected stack. A second plurality of cylinders are used to pierce any connecting material between the gasket to be singulated and the remainder of the stack. Once the web material is pierced, cylinder movement is effected so as to pull the selected gasket away from the stack, allowing any connecting material to sever and thereby singulate one gasket from the stack. Once the gasket is singulated, various insertion mechanisms are disclosed for inserting the singulated gasket into a pail lid groove.

19 Claims, 14 Drawing Sheets

GASKET SINGULATION AND INSERTION APPARATUS AND METHODS

BACKGROUND OF THE INVENTION

The present invention relates in general to apparata for the singulation of a gasket from a plurality of gaskets and the subsequent insertion of the singulated gasket into a receiving groove which is formed in another structure, such as a plastic or metal pail lid.

More specifically, the present invention relates to the singulation of a synthetic material gasket from a joined plurality wherein adjacent ones of the individual gaskets are initially joined together by a thin web of material. Singulation of a single gasket from the joined plurality is achieved by cutting, tearing, or in some fashion severing the joining or connecting web of material which is positioned between adjacent gaskets in the stack. Once a single gasket is free from the joined plurality or stack of gaskets, it is available to be handled by automated equipment so as to be positioned for insertion into the selected receiving channel or groove in the other structure.

When the receiving groove is part of a metal or plastic pail lid, the pail lid movement is also automated and timed with the gasket separation (i.e., singulation) steps. The selected pail lid, which is one of a plurality of sequentially staged or indexed pail lids, is moved into position as part of the overall insertion mechanism or apparata, according to the present invention. The gasket is moved into position and the insertion of the gasket into the pail lid groove is completed. Thereafter, the pail lid and gasket assembly is moved off line for subsequent processing.

While the use of synthetic gaskets in pail lids and similar structures is well known, the gaskets which are used are typically supplied to the manufacturer as individual gaskets, packaged in bulk. This means that these gaskets are provided to the end user, in the context of the one performing the installation step, in a turned, twisted, and tangled mass, very similar to a box of rubber bands when supplied in bulk. The particular gaskets which are associated with the present invention can range from as small as 1-½ inches in diameter to as large as 68 inches in diameter with virtually any cross sectional diameter in the case of O-ring styles, or with other overall and cross sectional shapes, depending on the application. Suitable materials for these gaskets include a wide range of elastomeric compounds and the gaskets which are ultimately fabricated can be solid or hollow (tubular) in lateral section. Regardless of the size, shape, or material of the gaskets, one common denominator is the turned, twisted, and tangled arrangement of such gaskets when they are supplied in bulk form. As a consequence, this bulk supply requires manual separation of the gasekts in order to prepare each gasket individually for its subsequent insertion into a pail lid. Whether the gaskets are manually loaded one at a time for insertion, or whether the gaskets are loaded or staged in multiple units for use with automated insertion equipment, each gasket must still be manually separated from the bulk supply, untangled, untwisted, and typically laid flat, at least for most of the present-day insertion equipment. This step of manually untangling each gasket and preparing it in a flat and untwisted form for insertion into a pail lid or similar structure is a time consuming, labor intensive step that adds to the finished pail lid cost. The additional time for this step can also have a bearing on the overall cycle time and through put rate for the pail lid and gasket combination.

Considering the current gasket handling procedures as described above, it would be an improvement if the manual, gasket untangling step could be eliminated and the entire process automated. This assumes that it would be possible to prepare singulated gaskets without twist and generally laid out into a circular form for the automated insertion process. Regardless of the singulation method and mechanism, it is important to have a supply of gaskets so that the repetitive cycle of gasket insertion, pail lid after pail lid, will have only minimal down time and infrequent cycle interruptions for the purposes of loading, securing, or staging a new supply of gaskets for the supply of pail lids.

The present invention provides an improvement to the current (typical) gasket insertion procedures by providing an automated mechanism and a unique sequence of steps to singulate each gasket from a plurality and to do so such that each singulated gasket is prepared for insertion into a pail lid, without any tangles and/or twists.

Gaskets of the type described herein are typically initially molded in the form of a generally cylindrical tube or coil with a series of gaskets sequentially stacked with a very thin connecting web of material between adjacent gaskets. This is the most efficient molding method and design, from the perspective of mold design costs and effectiveness, such that any waste is minimized. It is also important to note that the gaskets which are molded in this fashion are each aligned in a substantially flat orientation in a circular shape, at least for the O-ring shaped gaskets, and there are no twists, turns, or tangles between any of the gaskets of the molded stack. The generally circular form of each gasket accounts for the generally cylindrical configuration of the joined stack.

At the present time, the molder of such gaskets simply singulates the gaskets, one from the others, by severing the connecting web of material and then merely tossing each singulated gasket into a bulk container. Since no time is taken nor any care exercised as to how the gaskets are oriented when singulated and placed into the bulk container, this is where the tangling and twisting begins. If the gaskets are then parceled out into smaller lot quantities for individual orders, additional twisting and tangling can occur. While it might be possible for the OEM molder of the gaskets to carefully singulate and arrange each gasket, free of tangles and twists, the finished singulated gaskets would still have to be stacked or stored in some fashion in order to keep each one twist and tangle free. Similar care would have to be taken during shipment and this would inevitably add to the overall unit cost of each gasket. One of the realities of trying to singulate and prepare each gasket in a tangle-free and twist-free form is the type and style of automated equipment the end users might have. To be most effective, the gasket should be supplied in a form ready to use. This is obviously all wasted if the end user has no desire to automate the gasket insertion process. For example, the gaskets might be supplied with other equipment or parts where a tangled form or twist in the gasket is acceptable. Since there would be an added cost to carefully singulate each molded gasket if some, but not all, customers want tangle-free and twist-free gaskets, then the orders would have to be documented and segregated at the time of molding. Otherwise, all of the gaskets would have to be singulated and stocked in the same manner. What is done now is to simply bulk package the singulated gaskets, under the theory that the lower the unit cost the better and thereby let the end user deal with any twist and tangle problems.

The present invention is designed to accept the tubular (coiled) form of the plurality of molded gaskets, still connected together with the thin web of material between adjacent gaskets. This coiled form or stack of gaskets is utilized in the automated singulation equipment and methods of the present invention in the same way or form that it is molded by the OEM supplier. The molder does not have to singulate each gasket from the cylindrical stack which actually could lower the unit cost of each gasket. By allowing the design of the present invention to singulate each gasket in an automated fashion and to be inserted directly into the pail lid following singulation, no gasket twist is introduced by any of the intermediate processing steps. The results of the apparata and methods of the present invention are to fully automate both the gasket singulation step and the gasket insertion step in a novel and unobvious manner.

SUMMARY OF THE INVENTION

A gasket singulation apparatus for separating one gasket from a web-connected stack of gaskets according to one embodiment of the present invention comprises a mandrel for receiving the web-connected stack of gaskets, first support means for positioning the web-connected stack of gaskets at a predetermined location relative to the mandrel, separation means for piercing any web material between a selected pair of axially adjacent gaskets, drive means for axially moving the separation means so as to pull one gasket of the selected pair away from the other gasket of the selected pair, and second support means for supporting those gaskets remaining as part of the web-connected stack as the one gasket is separated from the original web-connected stack.

Also included as part of the present invention is a gasket insertion apparatus for inserting a gasket into an annular receiving groove in a pail lid. The gasket insertion apparatus, according to one embodiment of the present invention, comprises a gasket positioning mandrel defining an annular support lip, pail lid positioning means for moving a pail lid into a gasket-insertion position adjacent the annular support lip, wherein the annular receiving groove opens toward the annular support lip and gasket insertion means for engaging a gasket which is to be positioned on the annular support lip, the gasket insertion means including a gasket-contacting portion and two drive mechanisms wherein one drive mechanism is constructed and arranged for moving the gasket-contacting portion radially and the other drive mechanism is constructed and arranged for moving the gasket-contacting portion axially.

Also included as part of the present invention is a gasket singulation method for separating one gasket from a web-connected stack of gaskets, this particular method according to the present invention utilizes the gasket singulation apparatus described herein.

Additionally, the present invention includes a gasket insertion method for inserting a gasket into a generally annular receiving groove of a pail lid, wherein the gasket insertion method, according to the present invention, utilizes the gasket insertion apparatus described herein.

One object of the present invention is to provide an improved gasket singulation apparatus. Another object of the present invention is to provide an improved gasket insertion apparatus. Another object of the present invention is to provide an improved method of gasket singulation. A still further object of the present invention is to provide an improved method of gasket insertion.

Related objects and advantages of the present invention will be apparent from the following description.

DESCRIPTION OF THE PREFERRED EMBODIMENTS

Figure 1:
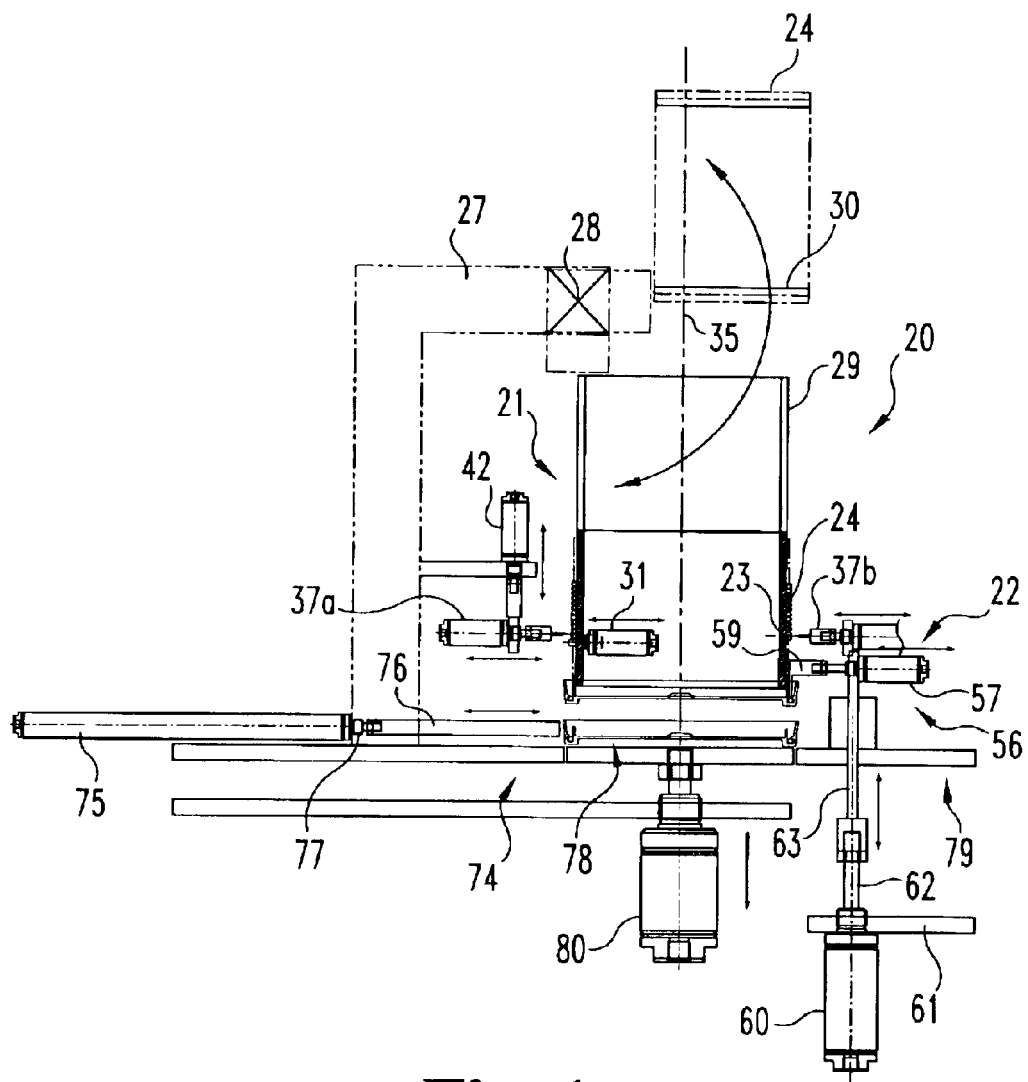
FIG. 1 is a diagrammatic, front elevational view of a gasket singulation apparatus according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
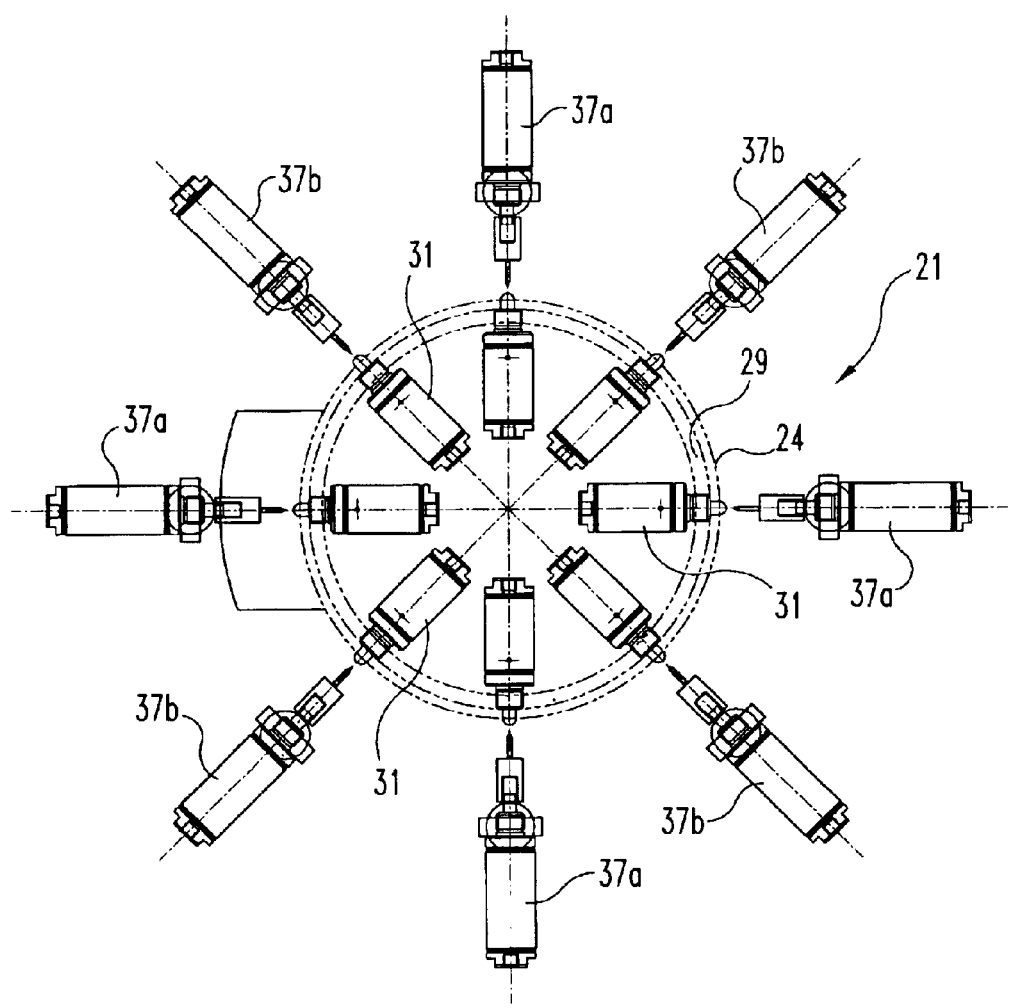
FIG. 2 is a diagrammatic, top plan view of selected portions of the FIG. 1 apparatus.
Figure 3:
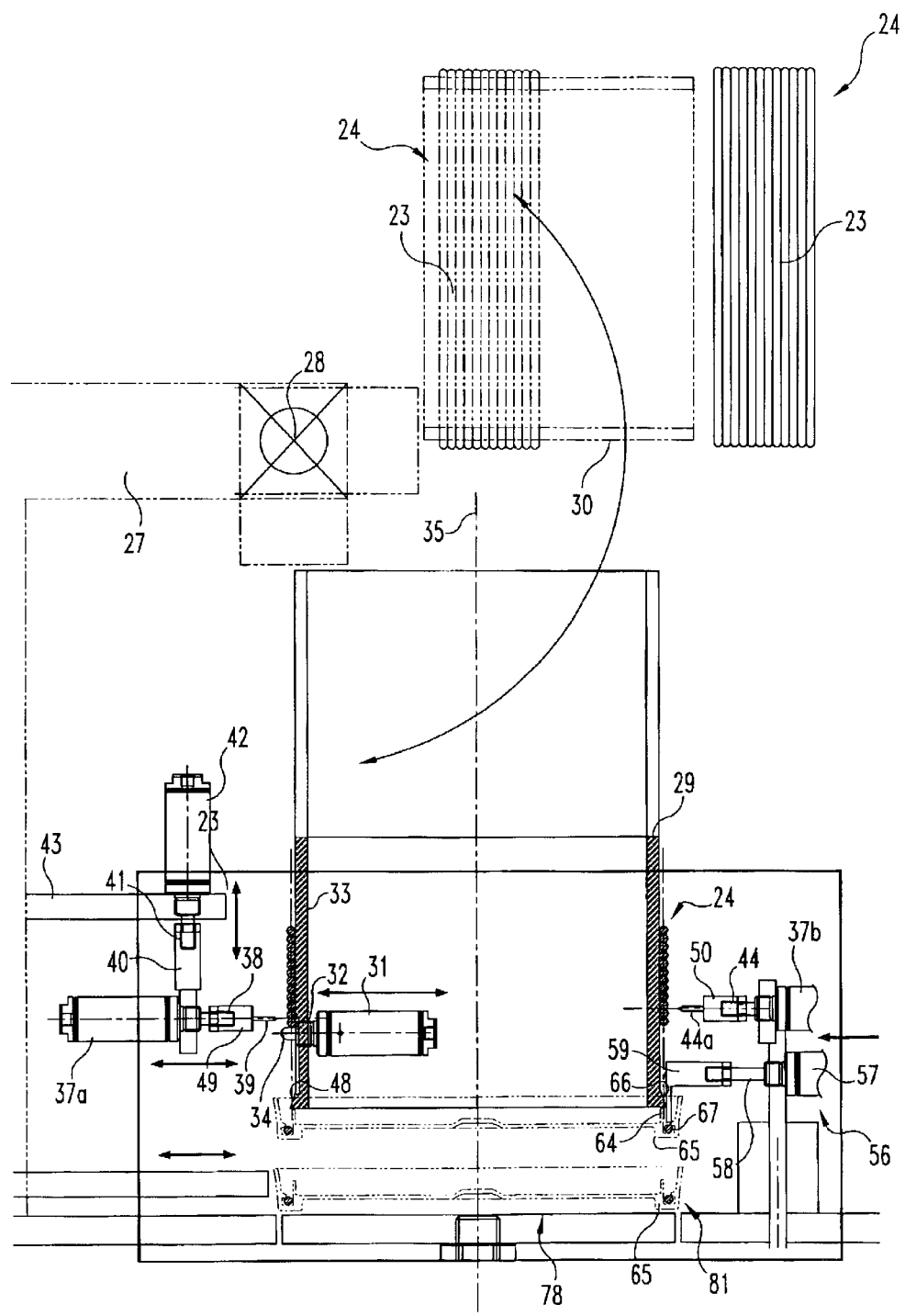
FIG. 3 is a diagrammatic, partial, enlarged front elevational view of the FIG. 1 apparatus.

Referring to FIGS. 1, 2, and 3, there is diagrammatically illustrated a gasket singulation and insertion mechanism 20 according to one embodiment of the present invention. Mechanism 20 includes, in combination, a gasket singulation mechanism 21 and a gasket insertion mechanism 22. The gasket singulation mechanism 21 can be used with other gasket insertion mechanisms and, conversely, the gasket insertion mechanism 22 can be used with other gasket singulation mechanisms. The ending step or stage of the gasket singulation process, using mechanism 21, is the separation of a single gasket 23 from the joined tubular or cylindrical stack 24 of gaskets 23. The starting or beginning step or stage of the gasket insertion process, using mechanism 22, is the handling of the singulated gasket 23 resulting from the gasket singulation process.

Considering the gasket singulation mechanism 21 and the corresponding method steps, the joined tubular stack 24 of gasket 23, is provided with an initial horizontal orientation, supported by holder 27. This is the broken line form for stack 24, as illustrated in FIG. 1. Holder 27, also illustrated in broken line form, is constructed and arranged to pivot (hinge) at joint 28 so that the horizontal orientation of stack 24 is changed to a vertical orientation for sliding onto cylindrical mandrel 29. A cylindrical support sleeve 30 is included to support stack 24 in the horizontal orientation and maintain the desired cylindrical shape of stack 24. When the stack 24 is moved to a vertical orientation, the stack 24 is able to slide off of the sleeve 30 down onto mandrel 29.

Mandrel 29 is a hollow, cylindrical member and positioned in the interior are an equally-spaced series of eight pneumatic air cylinders 31. All eight pneumatic cylinders 31 are illustrated in FIG. 2 while only one cylinder 31 is illustrated in FIGS. 1 and 3, merely to illustrate the axial location of all eight cylinders 31 without overly complicating the drawings. Each cylinder 31 is securely mounted in a horizontal orientation, relative to axial centerline 35, into an aperture 32 in the sidewall 33 of mandrel 29. Each aperture 32 is a through opening such that the plunger or piston 34 of the cylinder is able to extend through the sidewall 33 as illustrated in FIG. 3. In this extended orientation for each cylinder 31, the pistons 34 (eight total) are able to support the joined tubular stack 24 of gaskets 23 in the vertical orientation. It is the lower edge of the stack 24 that simply rests on top of the eight pistons 34 with the cylinders activated into their extended orientation.

Positioned on the exterior of mandrel 29, though not connected to mandrel 29, is a series of eight equally-spaced pneumatic air cylinders, four of which are identified as cylinders 37a and four of which are, in an alternating pattern, all identified as cylinders 37b. The piston 38 of each cylinder 37a is fitted with a gasket separating tip 39 which is pointed so as to be easily and accurately positioned between the lowermost gasket 23 of the axial stack 24 and the remainder of the gaskets 23. Each cylinder 37a is rigidly secured to a support arm 40 which in turn is connected to the piston 41 of a pneumatic air cylinder 42. Stationary support 43 is used to align and locate each cylinder 42. Considering the illustrated combination of cylinders 37a and 42, it should be understood that this connected subassembly is repeated three more times (four total) at equally-spaced locations around the exterior of mandrel 29.

The series of four, equally-spaced cylinders 37b are used as gasket-supporting cylinders while cylinders 37a as used as gasket-separating cylinders. In the illustrations of FIGS. 1 and 3, only a portion of one cylinder 37b is included as a representative example of how all four cylinders 37b are positioned and utilized. The cylinders 37b are axially stationary such that the extension and retraction of each piston 44 is horizontal, i.e., perpendicular to axial centerline 35, along a fixed plane. The piston 44 of each cylinder 37b is fitted with a separating/support tip 44a. While tip 44a is similar in many respects to tip 39, their ultimate functions are different.

Tip 39 is extended into mandrel 29 so as to puncture the connecting web of material between adjacent gaskets 23. The same is achieved by tip 44a in its extended position. Once the pistons 34 are retracted, the four cylinders 37a are lowered, via the extension of pistons 41, so as to pull the bottom (lowermost) gasket 23 free from the remainder of the gaskets which remain connected as part of stack 24. The pulling of the bottom or lowermost gasket 23 free from the remainder of the gaskets in stack 24 is achieved by actually tearing the connecting web of material between adjacent gaskets so as to sever completely this connecting web. As this bottom or lowermost gasket 23 is separated from the stack 24, the four cylinders 37b are used to hold or support the remainder of the gaskets 23 in stack 24.

Once the lowermost gasket is freed, i.e., singulated, it is able to drop down onto the annular lower lip 48 of mandrel 29. Lower lip 48 is inclined outwardly and downwardly such that a singulated gasket rests thereon without falling off due to the larger diameter at the bottom edge. With the singulated gasket thus positioned, the pistons 38 are first retracted and then pistons 41 of cylinders 42 are retracted so as to raise or lift cylinders 37a back to their cycle-starting (at rest) position. The next step is to energize the eight cylinders 31 so that the corresponding pistons 34 are extended back to their cycle-starting positions. Once the pistons 34 are in position, the pistons 44 of cylinders 37b are retracted. This allows the remaining gaskets 23 in stack 24 to drop down onto the pistons 34. This signifies the start of the new gasket-separation (singulation) cycle.

Each cylinder 37a is positioned in a generally horizontal orientation relative to axial centerline 35 and each cylinder 42 is positioned in a generally vertical orientation, with its axial centerline being substantially parallel to axial centerline 35. Each cylinder 37b is positioned in a generally horizontal orientation relative to axial centerline 35. While cylinders 31, 37a, 37b and 42 are preferably pneumatic air cylinders, other devices can be used. For example, another option would be to use hydraulic cylinders or ball screw devices. Other options would include the use of solenoids. One of the important features with regard to cylinders 37a, 37b, and 42 is to be able to control precisely the distance of travel and the ending location, especially for tips 39 and 44a and to a lesser extent the ending location for cylinders 37a. In order to fine tune the end point locations, the holder 49 for tip 39, the holder 50 for tip 44a, and support arm 40 are internally threaded. Pistons 38, 44, and 41 are externally threaded for receipt of their corresponding holder or arm. In this way, the degree or extent of threaded engagement precisely sets the end point location for tips 39 and 44a against mandrel 29. The distance of travel for cylinders 37a is also precisely set (a sufficient distance) to ensure that the lowermost gasket 23 actually separates from the stack 24.

Figure 12:
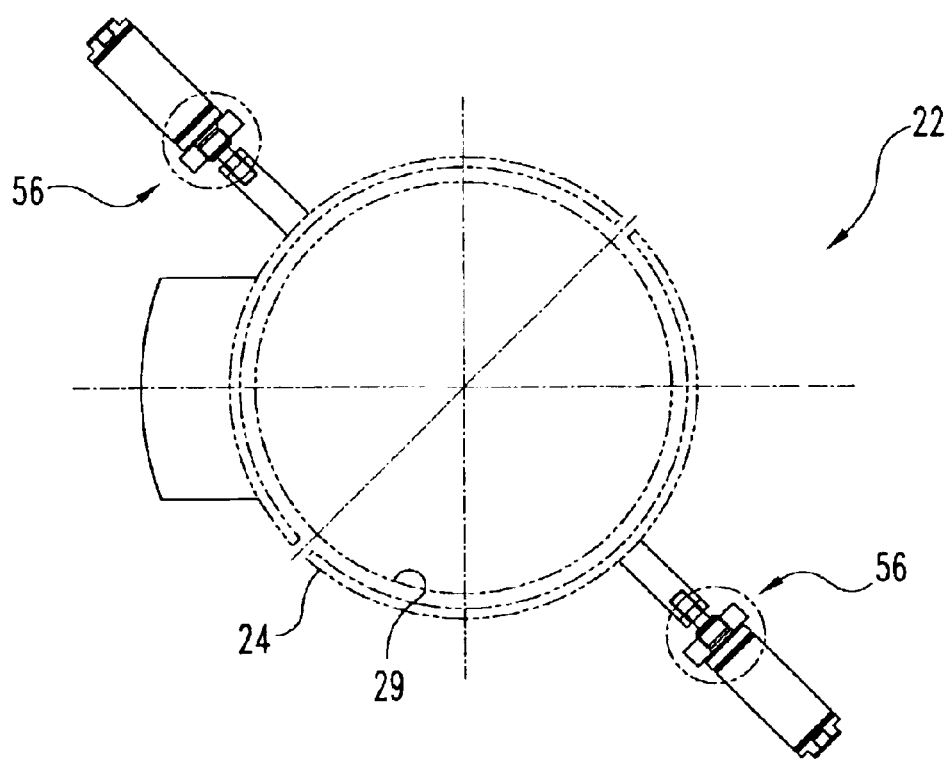
FIG. 12 is a diagrammatic, top plan view illustrating the insertion equipment for the FIG. 1 apparatus.

With one gasket 23 separated from the stack 24 (i.e., "singulated") and resting on top of annular lower lip 48, the gasket insertion step or cycle is ready to begin. With continued reference to FIGS. 1 and 3, the gasket insertion cycle of the preferred embodiment requires a gasket inserter subassembly 56 to be positioned outwardly of mandrel 29. It is believed that two such gasket inserter subassemblies 56 will be sufficient if positioned 180 degrees apart (see FIG. 12). However, an increased number of gasket inserter subassemblies can be used and would preferably be positioned with equal spacing so as to balance the insertion forces around the circumference of the singulated gasket 23. It is also to be understood that the movements, timing, and cycling of each subassembly 56 is substantially identical for all such subassemblies so as to be generally simultaneous. Each gasket inserter subassembly 56 includes a pneumatic air cylinder 57 for horizontal travel of piston 58 so as to move insertion tip 59 toward (extended) and away from (retracted) mandrel 29. Also included as part of subassembly 56 is a second pneumatic air cylinder 60 which is secured to support 61. Air cylinder 60 is constructed and arranged for vertical travel of piston 62 and aligned substantially parallel to axial centerline 35. Piston 62 is threadedly connected to support rod 63 which is securely attached to cylinder 57. This construction allows cylinder 57 to be raised and lowered by the action of cylinder 60 which in turn raises and lowers insertion tip 59. The inward movement of insertion tip 59 positions the gasket-contacting portion 64 over the singulated gasket 23 which is resting on top of lower lip 48. With an inverted pail lid 65 raised into position adjacent lower lip 48, the downward movement of tip 59 by way of the action of cylinder 60 brings portion 64 into contact with the singulated gasket. The inclined upper surface 66 of lower lip 48 causes the gasket 23 to move radially outwardly such that this portion of the gasket (i.e., that section adjacent insertion top 59) is pushed off of the lower lip 48 into alignment with the annular receiving groove 67 of the pail lid 65. It will be noted that the annular receiving groove 67 opens upwardly in the direction of the annular lower lip on the mandrel so that the travel of the singulated gasket 23 off of the mandrel lower lip causes it to move directly into the receiving groove 67. The receiving groove 67 typically includes a more narrow opening and below that a wider base. Consequently, once the gasket is pushed past the more narrow opening, it is captured and retained within the remainder of the receiving groove.

In view of the preferred materials for gasket 23, and in view of the preferred cross sectional size and shape, the single point of contact of one insertion tip 59 via portion 64 against the gasket in order to push the gasket 23 into the pail lid groove 67 actually causes a larger section of gasket 23 to be inserted into the receiving groove. This larger section is generally symmetrical on each side of tip 59 and ideally would cover approximately 180 degrees of the gasket circumference. This in turn would enable full or complete gasket insertion using only two gasket inserter subassemblies 56, as now illustrated in FIG. 12. If the circumferential length of the gasket section which is inserted by each subassembly is less than 180 degrees, then a third or more gasket inserter subassemblies will be required. The number of gasket inserter subassemblies 56 may also need to be increased depending on the narrow opening within the pail lid groove. If that opening is tighter, thereby causing or requiring greater force for insertion, the section of the gasket which can be inserted by a single gasket inserter subassembly 56 may not extend 180 degrees and thus would require at least one more and possibly additional inserter subassemblies.

While the preferred embodiment of the present invention is described in the context of a pail lid, either plastic or metal, the described gasket singulation apparatus and method of use of FIGS. 1–3 is basically independent of the receiving structure. Although the circular form of gasket 23 is preferably styled for an annular receiving groove, the singulated gasket could effectively be inserted into any groove or channel, so long as the circumferential length of the gasket matches the desired length of the groove. If the groove has a shape other than annular or cylindrical, a different scheme for the insertion could be required, at least for the turning or indexing. The described apparatus and method of gasket singulation of FIGS. 1–3 can also be used, at least in part, for gaskets formed into a web-connected stack, but with a gasket shape other than annular.

The gaskets 23 described for the present invention can range from as small as 1-½ inches in diameter up to as large as 68 inches in diameter with virtually any cross sectional diameter shape, at least for O-ring styles. Each gasket throughout this size range can be hollow (tubular) or solid in lateral section.

The movement of each pail lid 65 into position for insertion of a gasket 23 begins with a supply of pail lids at an upstream location or storage site. The delivery of the pail lid 65 can be automated in the sense of a conveyorized scheme or a pick-and-place apparatus design. Manual loading of the pail lids, one-by-one, is also an option. A conveyorized apparatus arrangement for transport of the pail lids can be used with the present invention structure illustrated in FIGS. 1, 2, 3, and 12. Regardless of the specific transport design, the pail lids are sequentially staged or arranged upstream from the gasket insertion location which is effectively a location concentric with mandrel 29. The illustration of multiple pail lids 65 is intended to diagrammatically illustrate the various positions or stages of pail lid movement.

The pail lid transport apparatus 74 which is illustrated includes a pail lid pushing pneumatic air cylinder 75 with a push rod 76 threadedly attached to piston 77. Cylinder 75 provides horizontal travel for any pail lid 65 which is positioned at location 78. The distance of travel moves the pail lid from location 78 to location 79. Also included as part of apparatus 74 is a second pneumatic air cylinder 80 which is arranged for raising any pail lid 65 which is positioned at location 78. Once a pail lid 65 is properly positioned at location 78, cylinder 80 is energized to raise the pail lid into position adjacent the lower lip 48 of mandrel 29 so that a gasket 23 can be inserted into the groove 67 of that pail lid, as has been described. As shown by step 2 in FIG. 5, the pail lid is raised into position adjacent lower lip 48 before the lowermost gasket 23 is singulated from the stack 24.

Once the gasket 23 is fully inserted into pail lid groove 67, this pail lid-gasket assembly 81 is then lowered by the retraction of the piston of cylinder 80 back to location 78. From this location the pail lid-gasket assembly 81 is moved downstream to a subsequent use, storage, shipping, or inspection, etc., station at location 79. The specific configuration of conveyors and other handling devices for the pail lid, both before and after gasket insertion, is optional as virtually any number of configurations and devices are suitable to sequentially position pail lids at location 78 and to remove the completed assembly 81 from location 79. As explained, while a fully automated production line would likely include an automated arrangement for transport of the pail lids, manual positioning and removal is an option.

Figure 4:
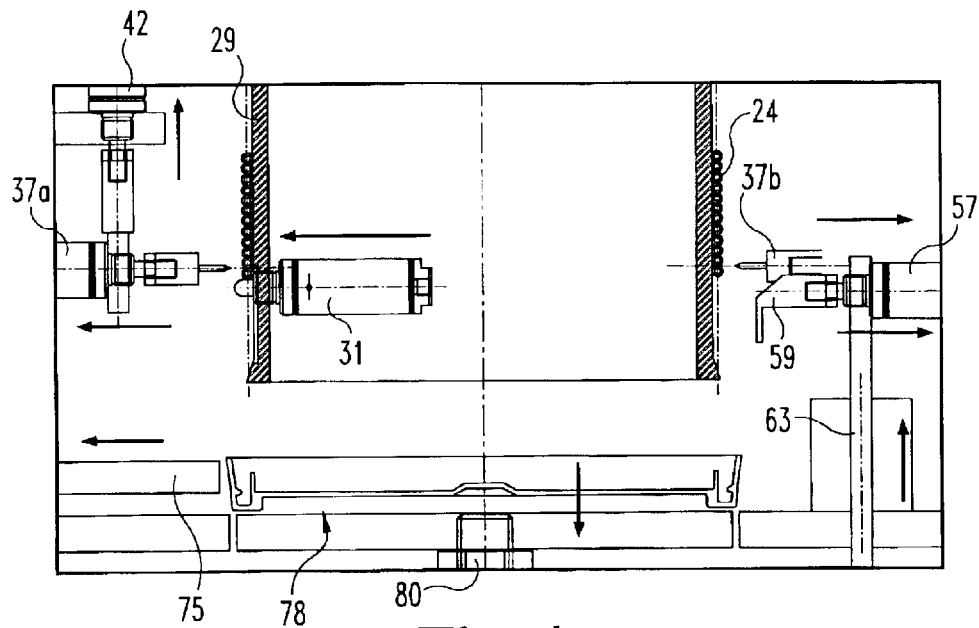
FIG. 4 is a diagrammatic, partial, enlarged front elevational view of the FIG. 1 apparatus illustrating a first step of the gasket singulation method utilizing the FIG. 1 apparatus.
Figure 5:
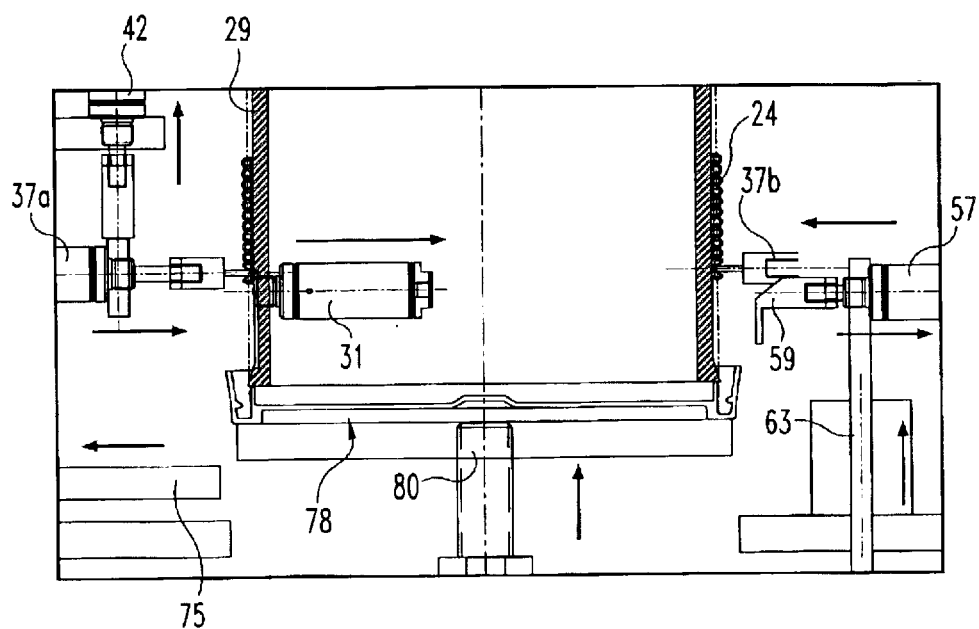
FIG. 5 is a diagrammatic, partial, enlarged front elevational view of the FIG. 1 apparatus illustrating a second step of the gasket singulation method utilizing the FIG. 1 apparatus.
Figure 6:
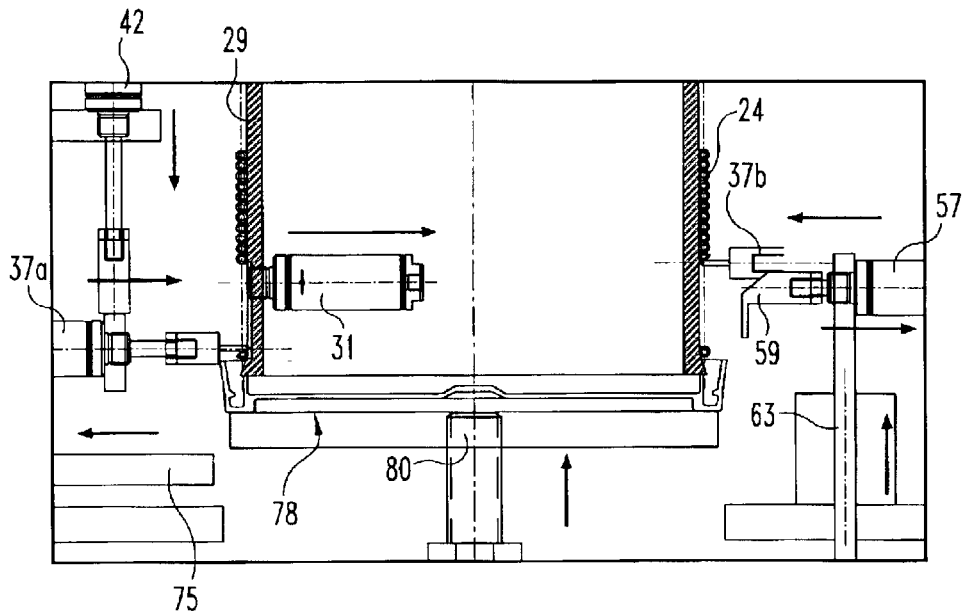
FIG. 6 is a diagrammatic, partial, enlarged front elevational view of the FIG. 1 apparatus illustrating a third step of the gasket singulation method utilizing the FIG. 1 apparatus.
Figure 7:
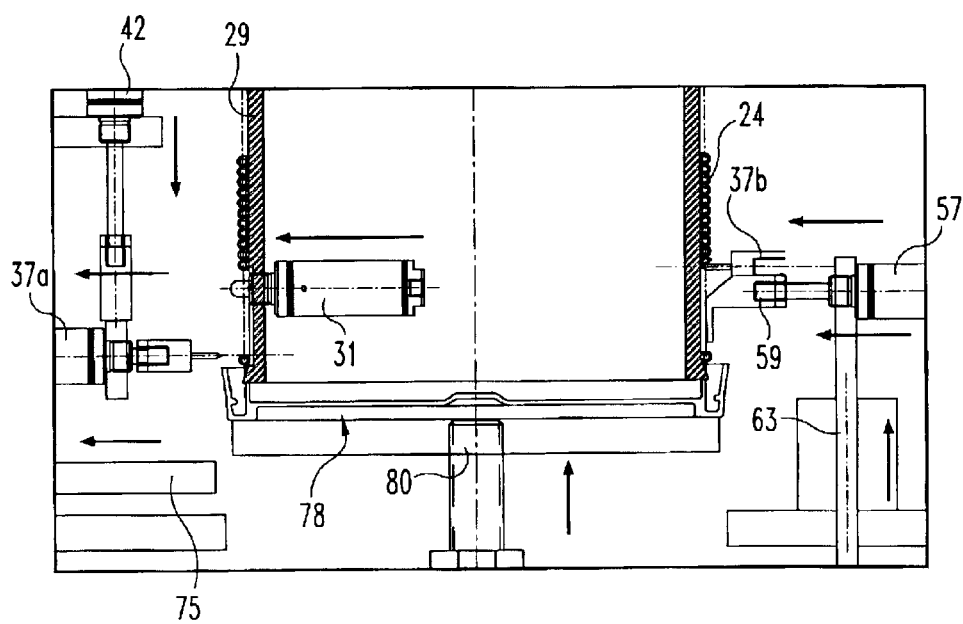
FIG. 7 is a diagrammatic, partial, enlarged front elevational view of the FIG. 1 apparatus illustrating a first step of the gasket insertion method utilizing the FIG. 1 apparatus.
Figure 8:
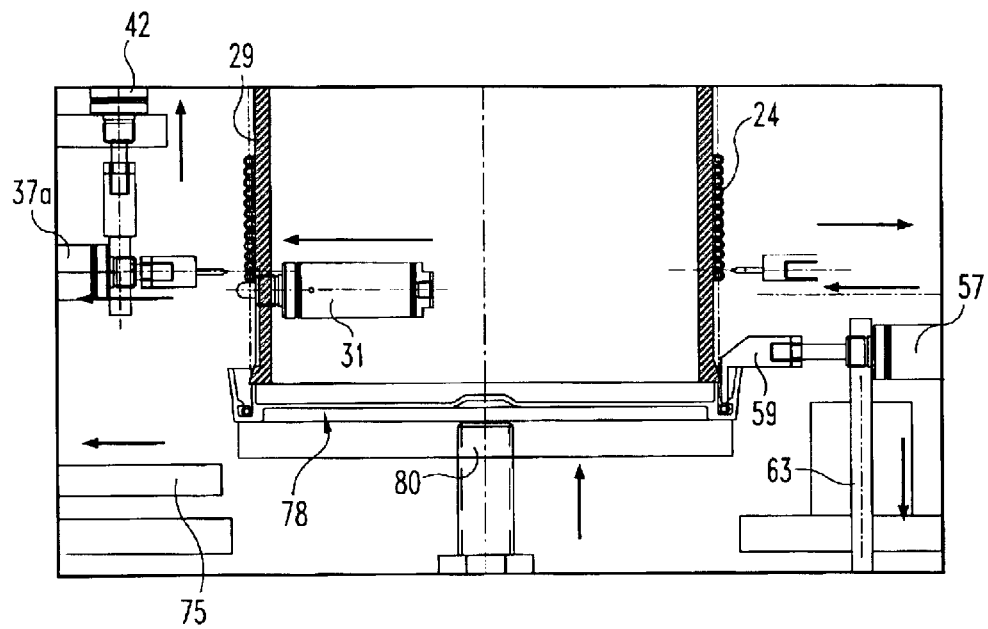
FIG. 8 is a diagrammatic, partial, enlarged detail, front elevational view of the FIG. 1 apparatus illustrating a second step of the gasket insertion method utilizing the FIG. 1 apparatus.
Figure 9:
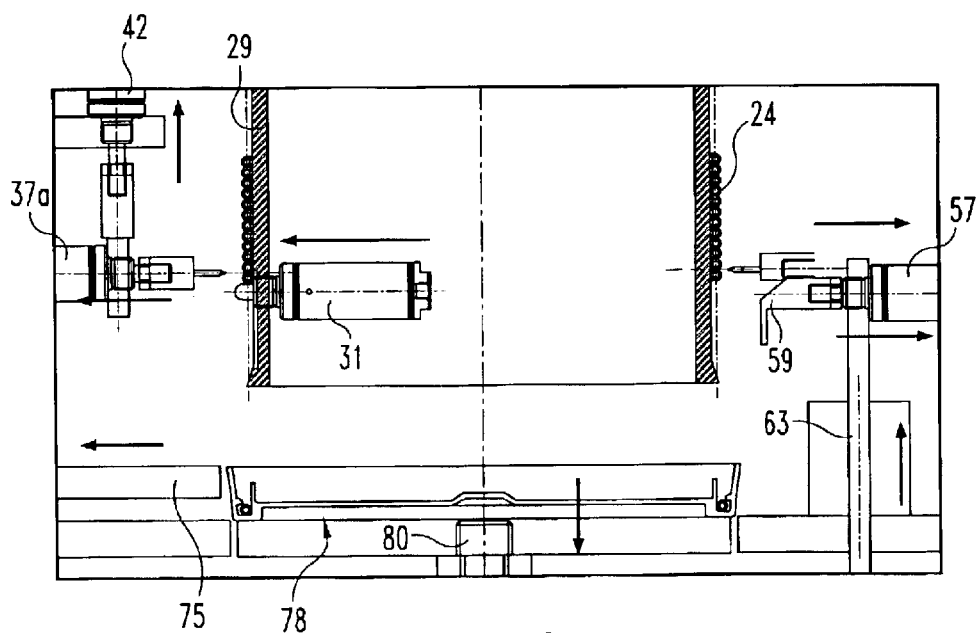
FIG. 9 is a diagrammatic, partial, enlarged front elevational view of the FIG. 1 apparatus illustrating a third step of the gasket insertion method utilizing the FIG. 1 apparatus.
Figure 10:
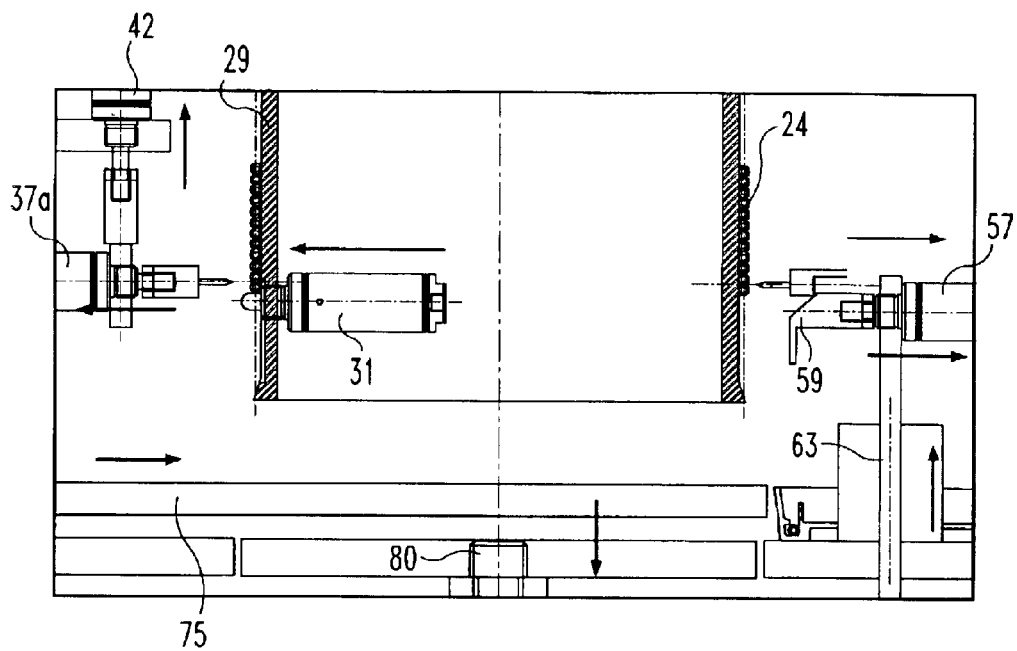
FIG. 10 is a diagrammatic, partial, enlarged front elevational view in full section illustrating the first step in beginning to recycle the equipment to the cycle starting point of FIG. 4.
Figure 11:
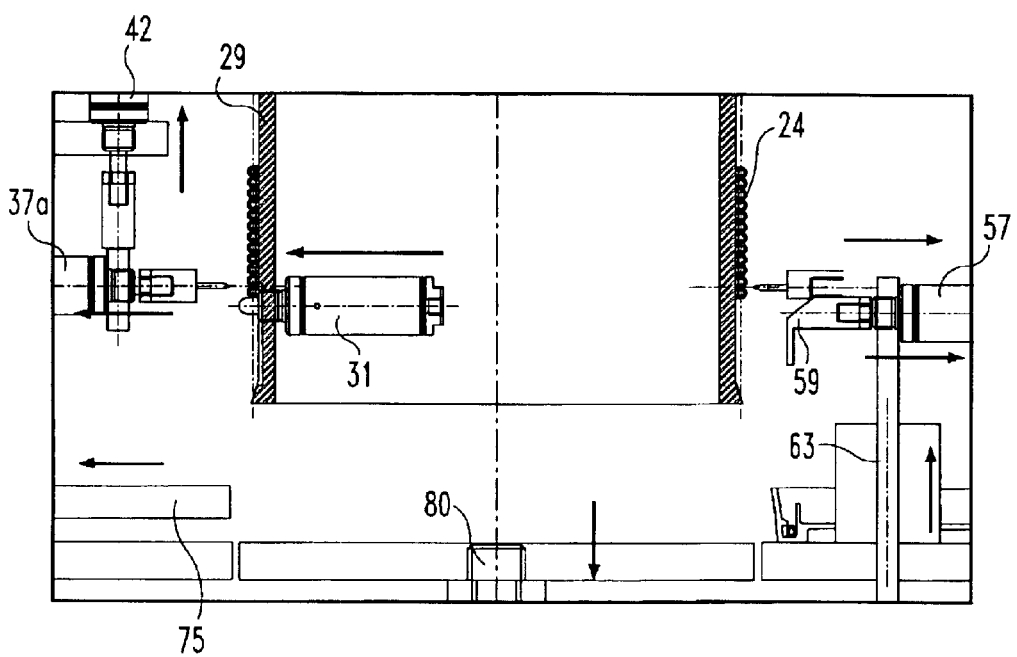
FIG. 11 is a diagrammatic, partial, enlarged front elevational view in full section illustrating the second step in beginning to recycle the equipment to the cycle starting point of FIG. 4.

With references to FIGS. 4–11, eight steps associated with the gasket singulation and insertion method, according to the present invention, are illustrated. Although these steps are sequential to one another and, while they cover the entire process of both gasket singulation and insertion into a pail lid, the first three steps represented by FIGS. 4–6 are generally thought of as gasket singulation steps. The next three steps, as represented by FIGS. 7–9, are generally thought of as gasket insertion steps. The last two steps of the eight steps illustrated, see FIGS. 10 and 11, are directed more to returning the singulation and insertion mechanisms to their beginning or starting location to continue with a new singulation and insertion cycle. Notwithstanding this partitioning of the eight steps, the following explanation will consider these eight steps as eight sequential steps in the entire cycle, beginning with gasket singulation, extending through gasket insertion, and returning all settings to the starting point for the next cycle to begin. Included as part of FIGS. 4–11, corresponding to these eight steps, is the hardware and components of the present invention. Since this hardware and components have already been described in conjunction with FIGS. 1, 2, 3, and 12, an important aspect of FIGS. 4–11 is to recognize the state or condition of each cylinder and to actually see the various pistons, rods, etc., as either extended or retracted. Step 1 of the present invention begins with the illustration of FIG. 4. In this specific condition or arrangement, the following status exists for each of the various cylinders:

For Step 1 (FIG. 4):

| Cylinder No. | Condition of Cylinder |
|---|---|
| 31 | Extended |
| 37a | Retracted |
| 37b | Retracted |
| 42 | Retracted |
| 57 | Retracted |
| 60 | Extended |
| 75 | Retracted |
| 80 | Retracted |

Step 2 of the gasket singulation and insertion method of the present invention is illustrated by FIG. 5. In this specific condition, the hardware and components of the present invention have the following status:

For Step 2 (FIG. 5):

| Cylinder No. | Condition of Cylinder |
|---|---|
| 31 | Retracted |
| 37a | Extended |
| 37b | Extended |
| 42 | Retracted |
| 57 | Retracted |
| 60 | Extended |
| 75 | Retracted |
| 80 | Extended |

Step 3 of the gasket singulation and insertion method of the present invention is illustrated by FIG. 6. In this specific condition, the hardware and components of the present invention have the following status:

For Step 3 (FIG. 6):

| Cylinder No. | Condition of Cylinder |
|---|---|
| 31 | Retracted |
| 37a | Extended |
| 37b | Extended |
| 42 | Extended |
| 57 | Retracted |
| 60 | Extended |
| 75 | Retracted |
| 80 | Extended |

Step 4 of the gasket singulation and insertion method of the present invention is illustrated by FIG. 7. In this specific condition, the hardware and components of the present invention have the following status:

For Step 4 (FIG. 7):

| Cylinder No. | Condition of Cylinder |
|---|---|
| 31 | Extended |
| 37a | Retracted |
| 37b | Extended |
| 42 | Extended |
| 57 | Extended |
| 60 | Extended |
| 75 | Retracted |
| 80 | Extended |

Step 5 of the gasket singulation and insertion method of the present invention is illustrated by FIG. 8. In this specific condition, the hardware and components of the present invention have the following status:

For Step 5 (FIG. 8):

| Cylinder No. | Condition of Cylinder |
|---|---|
| 31 | Extended |
| 37a | Retracted |
| 37b | Retracted |
| 42 | Retracted |
| 57 | Extended |
| 60 | Retracted |
| 75 | Retracted |
| 80 | Extended |

Step 6 of the gasket singulation and insertion method of the present invention is illustrated by FIG. 9. In this specific condition, the hardware and components of the present invention have the following status:

For Step 6 (FIG. 9):

| Cylinder No. | Condition of Cylinder |
|---|---|
| 31 | Extended |
| 37a | Retracted |
| 37b | Retracted |
| 42 | Retracted |
| 57 | Retracted |
| 60 | Extended |

-continued

| Cylinder No. | Condition of Cylinder |
| --- | --- |
| 75 | Retracted |
| 80 | Retracted |

Step 7 of the gasket singulation and insertion method of the present invention is illustration by FIG. 10. In this specific condition, the hardware and components of the present invention have the following status:
For Step 7 (FIG. 10):

| Cylinder No. | Condition of Cylinder |
| --- | --- |
| 31 | Extended |
| 37a | Retracted |
| 37b | Retracted |
| 42 | Retracted |
| 57 | Retracted |
| 60 | Extended |
| 75 | Extended |
| 80 | Retracted |

Step 8 of the gasket singulation and insertion method of the present invention is illustrated by FIG. 11. In this specific condition, the hardware and components of the present invention have the following status:
For Step 8 (FIG. 11):

| Cylinder No. | Condition of Cylinder |
| --- | --- |
| 31 | Extended |
| 37a | Retracted |
| 37b | Retracted |
| 42 | Retracted |
| 57 | Retracted |
| 60 | Extended |
| 75 | Retracted |
| 80 | Retracted |

The sequence of cylinder retraction and extension movements detailed for steps 1–8, as represented by FIGS. 4–11, must be coordinated such that for critical steps one cylinder piston is not retracted before another piston is extended, or vice versa. For example, in step 2, cylinders 37a and 37b are to be extended for gasket singulation and cylinder 31 is retracted. In order to prevent the stack 24 of gasket 23 from dropping lower on the mandrel 29, the piston 34 of cylinder 31 must not be retracted until piston 44 of each of the four cylinders 37b has been fully extended so that the stack 24 will be supported by the tips 44a of pistons 44 once cylinder pistons 38 are retracted.

In accordance with the teachings of the present invention, and as is shown, a variety of pneumatic control modules and timing circuits can be used to precisely sequence and control the extension and retraction movements, and the duration of each, for each cylinder. By knowing and controlling when each cylinder is activated or energized to change its state and by controlling the time duration in each state, steps 1–8 of FIGS. 4–11 are accurately and precisely performed. Design enhancements or modifications to using only pneumatic control modules and timing circuits include the use of optical sensors. Such sensors are positioned so as to be able to sense when a specific piston is retracted and/or when it is extended. Once a particular piston is sensed as being in position, then a sequential piston movement can be initiated.

For example, once again using cylinders 31, 37a, and 37b for the example, optical sensors would be arranged to generate corresponding control signals once the four pistons 44 are fully extended. Receipt of the fourth control signal signifies that all four pistons 44 are in position and that the four cylinders 31 can be energized to retract the pistons 34.

Optical sensors can also be used to verify when the stack 24 is in position on the mandrel and when the lowermost gasket 23 has been singulated and is resting on lower lip 48, ready for insertion into the pail lid 65. In order to preclude the (premature) use of cylinders 57 for gasket insertion, it is necessary to verify that a pail lid has been raised into position at the bottom of the mandrel. While the extended condition of cylinder 80 could be one indication of a pail lid in position, that is true only if a pail lid was initially properly placed at location 78. Consequently, the use of an optical sensor is preferred to actually verify that a pail lid has been raised into position before energizing cylinders 57 and 60 for the gasket insertion step.

Referring now to FIGS. 13–23, a second embodiment of the present invention is illustrated. Included as part of this second embodiment is the gasket singulation and insertion mechanism 120 and its method of use for insertion of a singulated gasket 121 into a pail lid 122.

Mechanism 120 includes a first station 123 for the stacking and presentation of the individual gaskets 121. While a series of individual gaskets 121 can actually be loaded at station 123, the preferred embodiment will utilize a web-connected stack 124 of gaskets 121 which will be loaded as an integral unit into a double-sleeved mandrel nest 125. The inner cylindrical wall 126 of mandrel nest 125 and the concentric outer cylindrical wall 127 are spaced apart a distance which is just slightly greater than the lateral cross sectional diameter of the corresponding gaskets as part of stack 124 to be positioned between the two concentric cylindrical walls 126 and 127.

While a variety of support and lift or push mechanisms can be used to support and raise the stack 124 of gaskets 121 which is positioned between the concentric pair of cylindrical walls 126 and 127, the preferred mechanism uses lift rods connected to a ball screw.

By positioning an abutment floor or stationary annular ring 130 between the inner and outer walls 126 and 127, the axial depth of the annular clearance space 131 can be selected based on the axial height of the stack 124 of gasket 121 to be loaded into mandrel nest 125. It is also envisioned as part of the present invention that the "stationary" annular ring 130 can be adjusted as to its axial depth to accommodate varying heights for stack 124.

A lift platform 132 is positioned below the mandrel nest 125 and is acted upon by the piston 133 of ball screw device 134. Connected to platform 132 are a series of four equally-spaced lift rods 135 arranged into a circular pattern. Each lift rod 135 extends axially upwardly in the direction of stack 124. The stationary annular ring 130 is perforated with circumferential clearance apertures equal in number and corresponding in spacing to the lift rods 135. Each lift rod 135 extends up into and through a corresponding aperture in the stationary annular ring 130 such that each lift rod is able to push in an upward direction on the lower surface of the stack 124 of gaskets 121, at four equally-spaced locations, in order to raise the entire stack 124. Raising stack 124 allows the uppermost gasket 121a of that stack to be positioned adjacent to and immediately above the uppermost edges 126a and 127a of the inner and outer walls 126 and 127, respectively. An alternative construction uses the lift rods 135 to actually push upwardly on the annular ring 130 to raise the stack 124 of gaskets. In this alternative construction, the annular ring 130 is not stationary, but actually moveable.

In operation, the ball screw device 134 is energized so as to push upwardly on platform 132 which in turn pushes upwardly on the series of lift rods 135. As these lift rods 135 travel upwardly through the apertures in the annular ring 130, the upper ends of the lift rods 135 push against the bottom surface of the lowermost gasket 121b in the web connected stack 124. Once the uppermost gasket 121a clears the upper edges 126a and 127a of walls 126 and 127, respectively, an optical sensor 136 (i.e., electric eye) watches for the uppermost gasket 121a. Once the uppermost gasket 121a clears the upper edges of the inner and outer walls 126 and 127, an electrical signal is sent to the ball screw device 134 instructing it to stop. This then fixes the uppermost gasket 121a at a location just above the upper edges 126a and 127a of the inner and outer walls.

Figure 13:
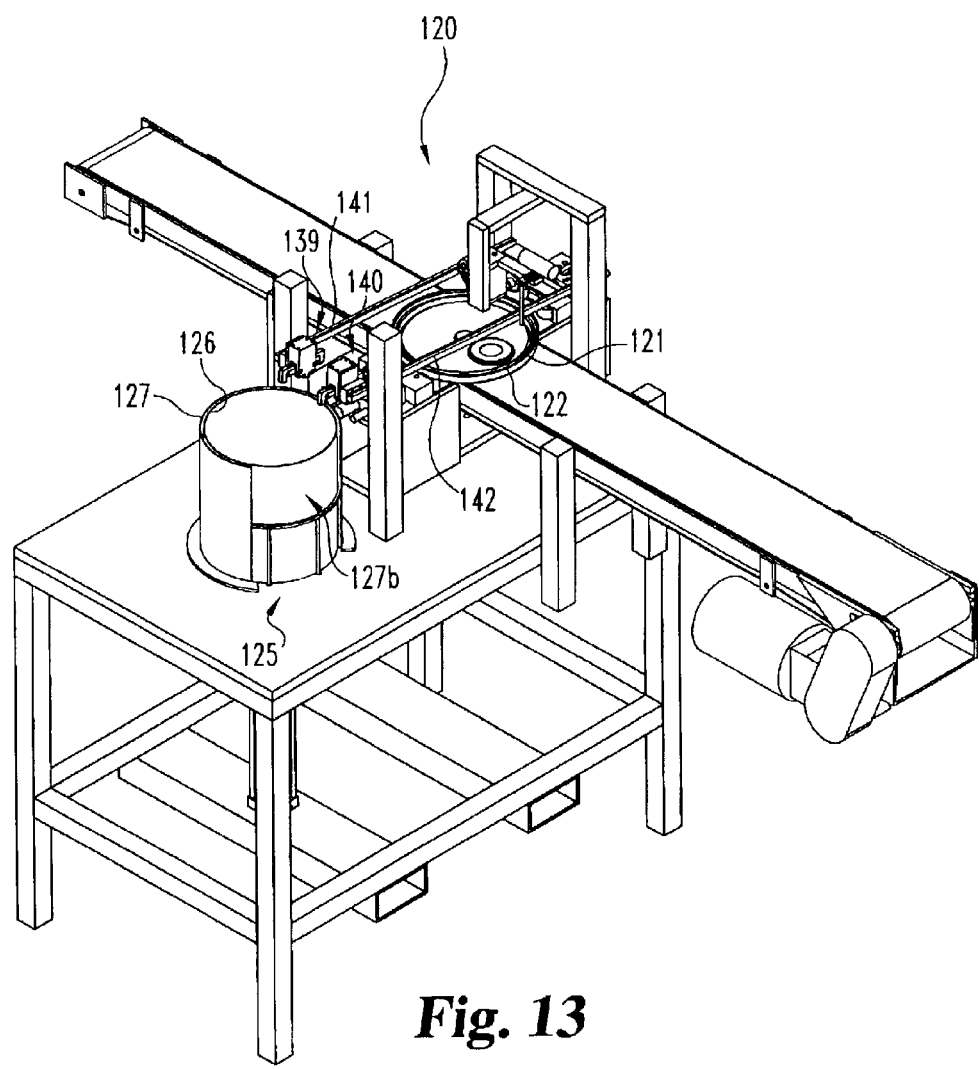
FIG. 13 is a diagrammatic, perspective view of a gasket singulation and insertion apparatus according to another embodiment of the present invention.
Figure 14:
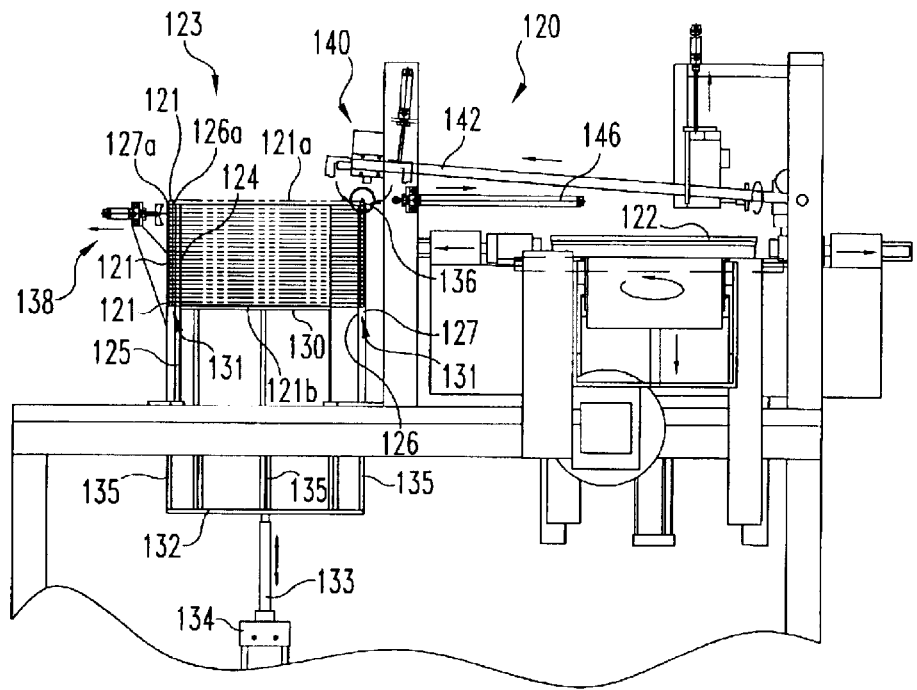
FIG. 14 is a diagrammatic, side elevational view of the FIG. 13 apparatus, illustrating the first step in the overall singulation and insertion method.
Figure 15:
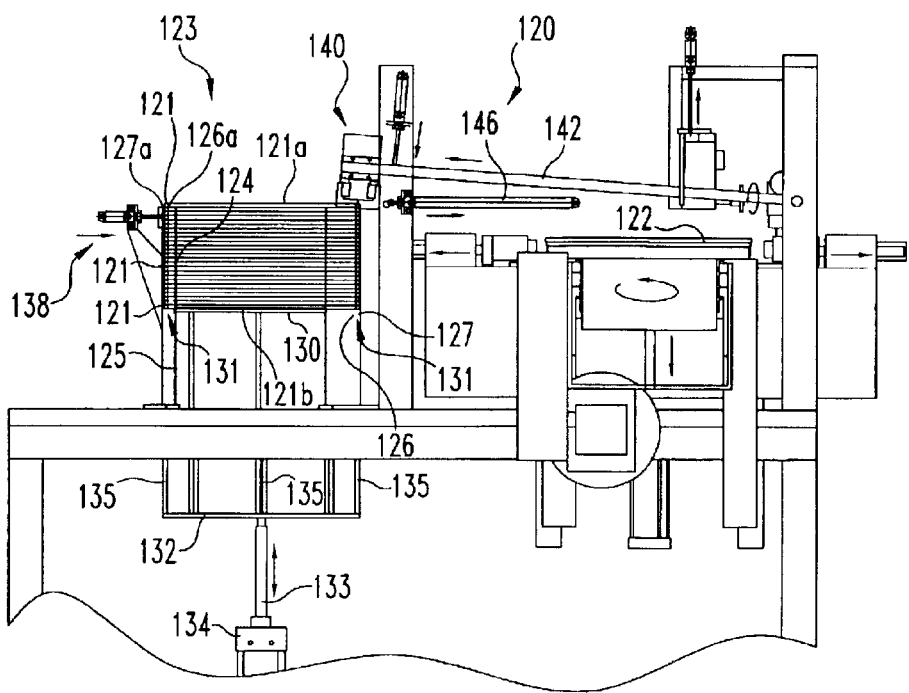
FIG. 15 is a diagrammatic, side elevational view of the FIG. 13 apparatus, illustrating the second step in the overall singulation and insertion method.
Figure 16:
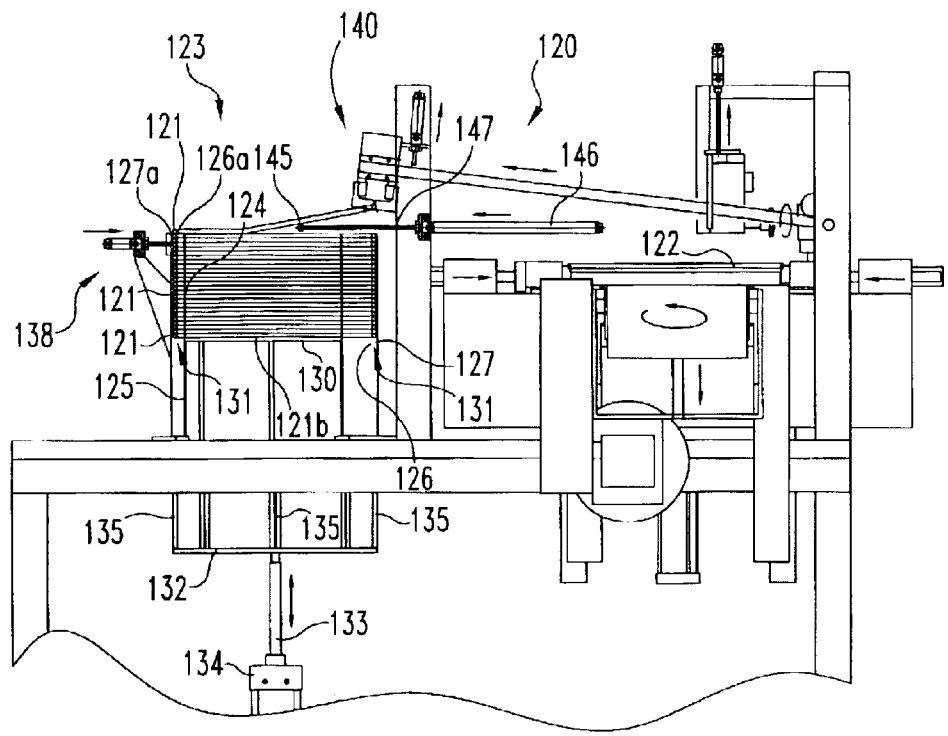
FIG. 16 is a diagrammatic, side elevational view of the FIG. 13 apparatus, illustrating the third step in the overall singulation and insertion method.
Figure 17:
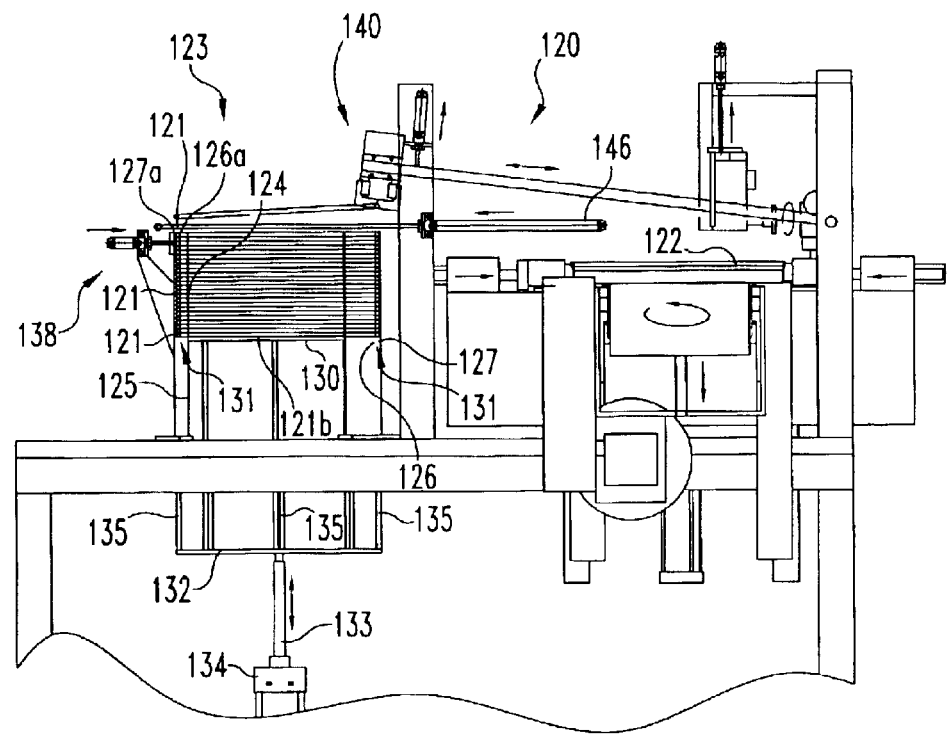
FIG. 17 is a diagrammatic, side elevational view of the FIG. 13 apparatus, illustrating the fourth step in the overall singulation and insertion method.

As illustrated in FIG. 13, the outer cylindrical wall 127 can be formed as a partial cylinder with an open front section 127b. This allows the stack 124 of gasket 121 to be viewed and to be adjusted or untangled if problems might develop. This open section also allows the use of a gasket clamping arrangement 138. As will be explained, the uppermost gasket 121a is to be singulated from stack 124 so that it can be transported to the insertion station for inserting the singulated gasket into a corresponding pail lid. As the uppermost gasket 121a is singulated from the stack 124, it is important that the remainder of the gaskets in stack 124 remain stationary and not be pulled free or pulled out of the annular clearance space 131.

The next step in the gasket singulation process is to use a pair of gripping mechanisms 139 and 140 which are positioned above the stack 124 of gaskets 121 along one side. By the use of cylinders 141 and 142, the two gripping mechanisms 139 and 140 are manipulated so as to grip onto the uppermost gasket 121a and pull it upwardly away from the remainder of stack 124, see FIGS. 15 and 16. With the remaining gaskets of the stack 124 clamped onto by clamping arrangement 138, this begins the tearing of the molded web of material connecting the uppermost gasket 121a with the remainder of the stack 124. As this singulation process begins and the separation of the uppermost gasket 121a begins, a separating rod 145 is used to facilitate the singulation. During the travel of rod 145 horizontally across the upper edges 126a and 127a, the gripping mechanisms 139 and 140 continue to grip onto the uppermost gasket 121a. Cylinder 146 is energized to effect travel of piston 147 which is connected to the separation rod 145. The extended travel distance of piston 147 is such that it pushes rod 145 completely across the two cylindrical walls 126 and 127, see FIG. 17.

Figure 18:
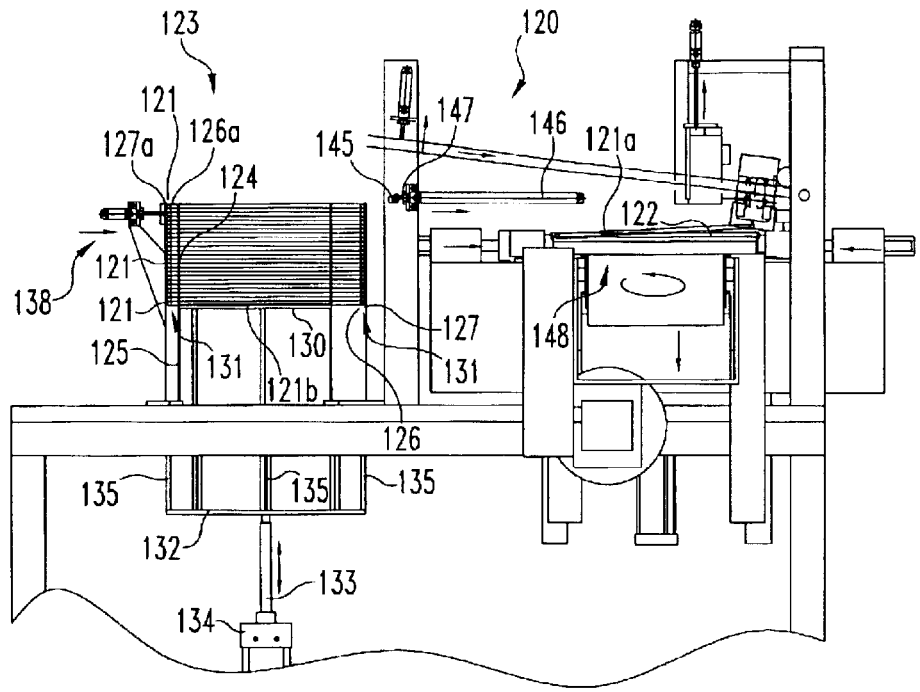
FIG. 18 is a diagrammatic, side elevational view of the FIG. 13 apparatus, illustrating the fifth step in the overall singulation and insertion method.

With gasket 121a singulated, cylinders 141 and 142 are then retracted and this pulls the singulated gasket 121a into position above pail lid 122 at the insertion station 148, see FIG. 18. During this same step in the overall process, the piston 147 of cylinder 146 is retracted so as to pull the separating rod 145 back to the start position, ready for singulation of the next gasket of the stack 124.

Figure 19:
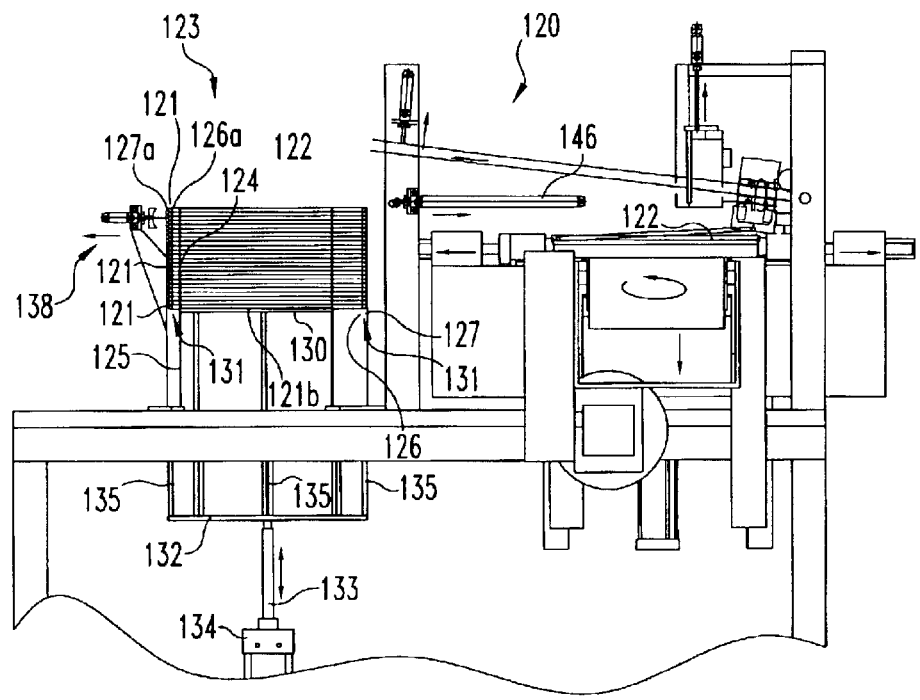
FIG. 19 is a diagrammatic, side elevational view of the FIG. 13 apparatus, illustrating the sixth step in the overall singulation and insertion method.
Figure 20:
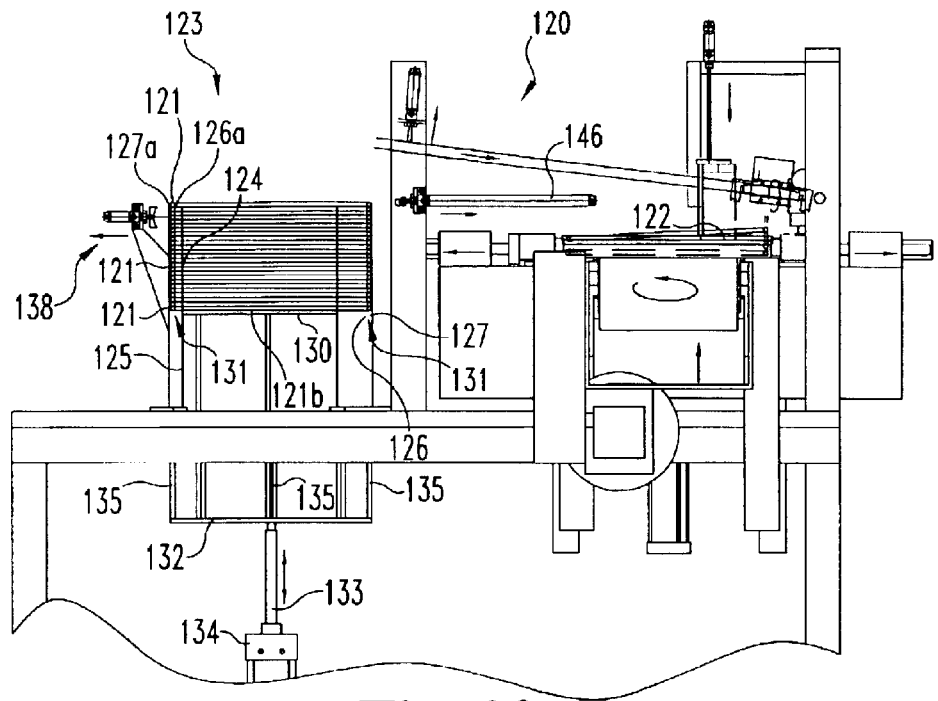
FIG. 20 is a diagrammatic, side elevational view of the FIG. 13 apparatus, illustrating the seventh step in the overall singulation and insertion method.
Figure 21:
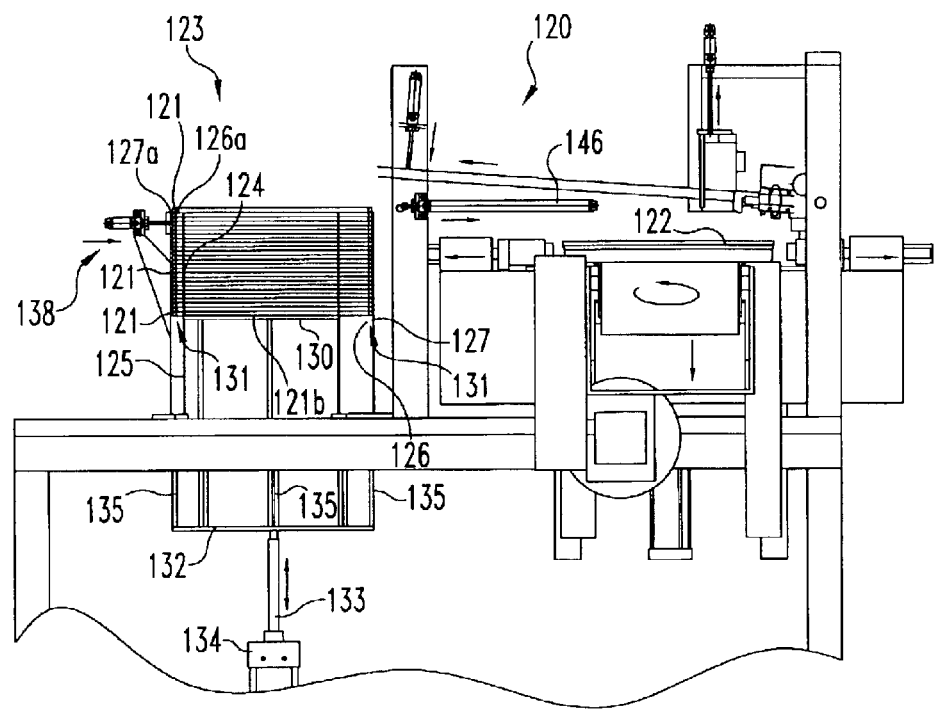
FIG. 21 is a diagrammatic, side elevational view of the FIG. 13 apparatus, illustrating the eighth step in the overall singulation and insertion method.

FIGS. 19, 20, and 21 illustrate the concluding steps to the process. With the singulated gasket 121a in position above the pail lid 122 and being arranged substantially concentric with the receiving groove 151 (see FIG. 22) of the pail lid 122, the insertion process begins.

Figure 22:
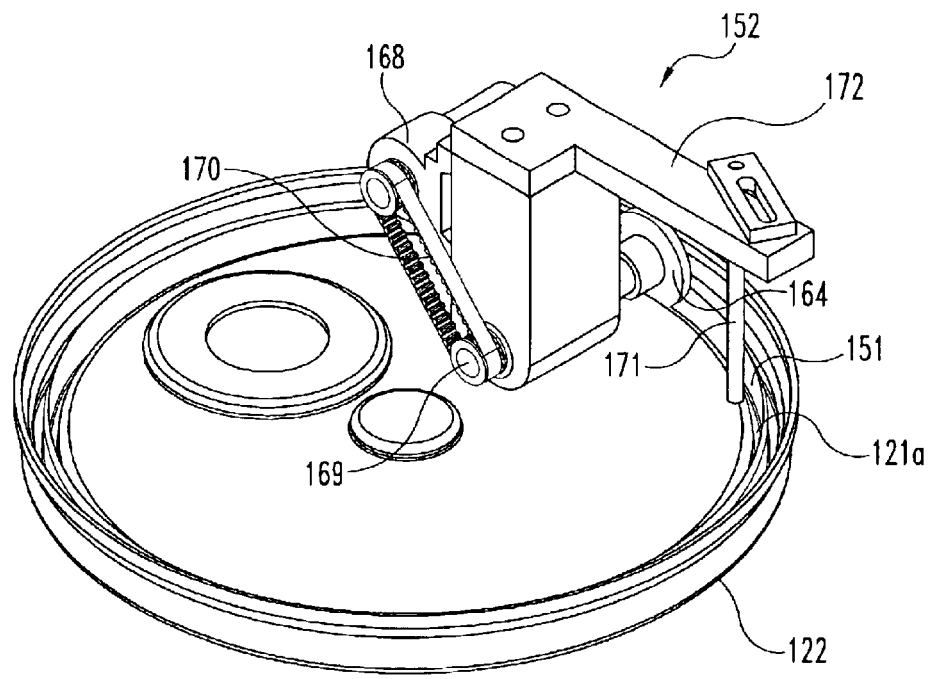
FIG. 22 is a diagrammatic, perspective view of the gasket insertion mechanism comprising one portion of the FIG. 13 apparatus.
Figure 23:
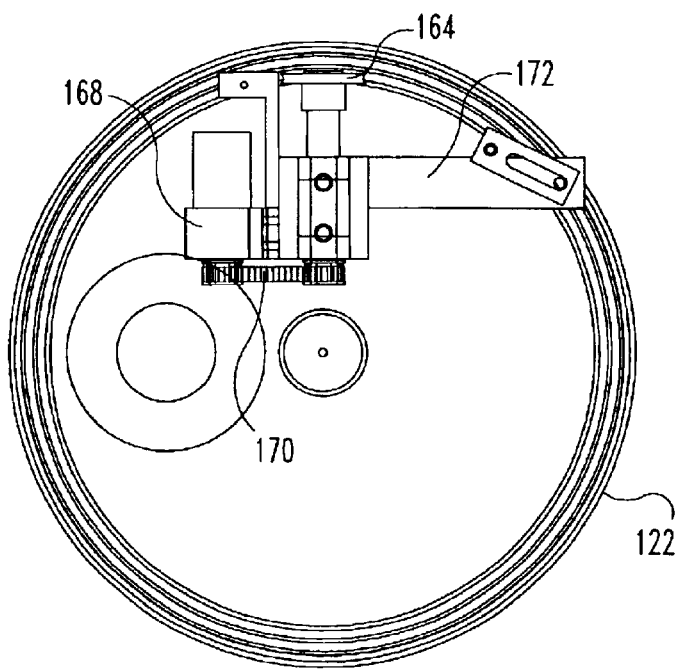
FIG. 23 is a diagrammatic, top plan view of the FIG. 22 mechanism.

The actual insertion process and the use of the insertion mechanism 152 is illustrated in FIGS. 22 and 23. Insertion mechanism 152 is securely connected to the piston 153 of cylinder 154 for axial movement (i.e., raising and lowering) of mechanism 152. Pail lids 122 are sequentially delivered to the insertion station 148 and become positioned between opposed pail lid clamps 155 and 156 which are movable toward and away from the pail lid by the action of cylinders 157 and 158, respectively.

The pail lid 122 which is positioned for gasket insertion at station 148 is positioned on a pail lid rotation unit 161. Rotation unit 161 includes a lift cylinder 162 and a turntable 163 whose axial height is controlled by cylinder 162. As the gasket insertion mechanism 152 is operated, the pail lid 122 rotates so that a different section of the uninstalled gasket is presented to insert drive roller 164 of mechanism 152. In operation, a pail lid 122 is positioned at the insertion station 148 between clamps 155 and 156 and concentric with turntable 163, even though the turntable is not yet raised into contact with the pail lid 122. The positioning of the pail lid can be performed while the gasket 121 to be inserted into the receiving groove 151 is being singulated or can be moved into position prior to singulation. The next step is to align the singulated gasket 121a on the pail lid so as to be generally aligned with the receiving groove 151. The gripping mechanisms 139 and 140 are released as the lift cylinder 162 raises the turntable 163 into contact with the underside of the pail lid 122. As this action is occurring, the insertion mechanism 152 is lowered into engagement with the upper surface of the pail lid by cylinder 154. As mechanism 152 is operated, the insert drive roller 164 pushes the gasket 121a into the receiving groove 151 of the pail lid 122. The rotation of drive roller 164 helps to impart rotary motion to the pail lid. Since the pail lid is now supported by the turntable 163 which freely rotates, the pail lid rotates as the drive roller rotates as part of the gasket insertion process.

Insertion mechanism 152 includes a gear motor 168 which is connected to drive roller shaft 169 by drive belt 170. The gasket guide pin 171 which is supported by arm 172 helps to guide and direct the gasket 121a into position above the receiving groove 151 of the pail lid 122. This "upstream" gasket alignment enables the drive roller 164 to push the gasket 121a into the receiving groove.

Once the gasket is fully installed into the receiving groove throughout its entire circumference, the pail lid is pushed out of position in order to prepare and reset the equipment for gasket insertion into the next pail lid. The pail lids are preferably fed into and out of the insertion station 148 by the use of conveyors and cooperating pick-and-place devices.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gasket singulation apparatus for separating one gasket from a web-connected stack of gaskets, said gasket singulation apparatus comprising:

a mandrel for receiving said web-connected stack;

first support means for positioning said web-connected stack at a predetermined location relative to said mandrel;

separation means for piercing any web material between a selected pair of axially adjacent gaskets;

drive means for axially moving said separation means so as to pull one gasket of said selected pair away from the other gasket of said selected pair; and second support means for supporting those gaskets remaining as part of said web-connected stack as said one gasket is separated from the original web-connected stack.

2. The gasket singulation apparatus of claim 1 wherein said first support means includes a pneumatic air cylinder.

3. The gasket singulation apparatus of claim 2 wherein said mandrel defines an interior space and said pneumatic air cylinder is positioned in said interior space.

4. The gasket singulation apparatus of claim 3 wherein said mandrel includes a sidewall defining an aperture and said pneumatic air cylinder including a movable piston constructed and arranged to extend through said aperture into a blocking position beneath said web-connected stack.

5. The gasket singulation apparatus of claim 1 wherein said separtion means includes a pneumatic air cylinder having a movable piston constructed and arranged with a pointed tip.

6. The gasket singulation apparatus of claim 5 wherein said pneumatic air cylinder being positioned exteriorly of said mandrel and in a location relative to said mandrel for said pointed tip to intersect said web-connected stack.

7. The gasket singulation apparatus of claim 1 wherein said drive means includes a pneumatic air cylinder having a movable piston that is connected to said separation means.

8. The gasket singulation apparatus of claim 1 wherein said second support means includes a pneumatic air cylinder.

9. The gasket singulation apparatus of claim 1 wherein said first support means includes a first pneumatic air cylinder including a movable piston and wherein said separation means includes a second pneumatic air cylinder having a movable piston constructed and arranged with a pointed tip.

10. The gasket singulation apparatus of claim 9 wherein said drive means includes a third pneumatic air cylinder having a movable piston that is connected to said separation means.

11. The gasket singulation apparatus of claim 10 wherein said second support means includes a fourth pneumatic air cylinder including a movable piston.

12. The gasket singulation apparatus of claim 11 wherein said first, second, third and fourth pneumatic air cylinders each have a longitudinal axis corresponding to the direction of piston movement.

13. The gasket singulation apparatus of claim 12 wherein the longitudinal axes of said first, second and fourth pneumatic air cylinders are substantially parallel to each other.

14. The gasket singulation apparatus of claim 13 wherein the longitudinal axis of said third pneumatic air cylinder is substantially perpendicular to the longitudinal axis of said second pneumatic air cylinder.

15. A gasket singulation method for separating one gasket from a web-connected stack of gaskets, said gasket singulation method comprising the following steps:
providing a receiving mandrel;
providing a web-connected stack of gaskets;
providing a first support member for setting the axial position of said web-connected stack of gaskets relative to said receiving mandrel;
sliding said web-connected stack of gaskets onto said receiving mandrel until said first support member is contacted by said web-connected stack of gaskets;
inserting a separating member into said web-connected stack of gaskets between the axially lowest gasket and an axially adjacent gasket;
inserting a second support member into said web-connected stack of gaskets between the axially lowest gasket and the axially adjacent gasket;
moving said first support member out of contact with said web-connected stack of gaskets; and
axially moving said separating member so as to pull said axially lowest gasket away from said axially adjacent gasket, said axially moving being of a sufficient distance to separate said axially lowest gasket from the remainder of said web-connected stack.

16. The gasket singulation method of claim 15 wherein the step of inserting a separating member includes the step of operating a pneumatic air cylinder for movement of a corresponding pneumatic air cylinder piston.

17. The gasket singulation method of claim 16 wherein the step of inserting a second support member includes the step of operating a pneumatic air cylinder for movement of a corresponding pneumatic air cylinder piston.

18. The gasket singulation method of claim 17 wherein the step of moving said first support member includes the step of operating a pneumatic air cylinder for movement of a corresponding pneumatic air cylinder piston.

19. The gasket singulation method of claim 18 wherein the step of axially moving said separating member includes the step of operating a pneumatic air cylinder for movement of a corresponding pneumatic air cylinder piston.

* * * * *